(12) United States Patent
von Holst et al.

(10) Patent No.: US 10,065,473 B2
(45) Date of Patent: Sep. 4, 2018

(54) CONTROL DEVICE OF A VEHICLE SUSPENSION

(71) Applicant: Deere & Company, Moline, IL (US)

(72) Inventors: Christian von Holst, Hettenleidelheim (DE); Tobias Hegler, Hassloch (DE); Mathias Klittich, Mannheim (DE); Michael Kremb, Rockenhausen (DE); Norman Rössel, Mannheim (DE); Andreas Wehle, Nussloch (DE); Günther Wolf, Worms (DE)

(73) Assignee: Deere & Company, Moline, IL (US)

( * ) Notice: Subject to any disclaimer, the term of this patent is extended or adjusted under 35 U.S.C. 154(b) by 87 days.

(21) Appl. No.: 15/239,387

(22) Filed: Aug. 17, 2016

(65) Prior Publication Data

US 2017/0050487 A1 Feb. 23, 2017

(30) Foreign Application Priority Data

Aug. 20, 2015 (DE) .......................... 10 2015 215 872

(51) Int. Cl.
*B60G 17/018* (2006.01)
*B60G 17/005* (2006.01)
(Continued)

(52) U.S. Cl.
CPC ............. *B60G 17/005* (2013.01); *B60G 9/02* (2013.01); *B60G 11/265* (2013.01); *B60G 13/08* (2013.01);
(Continued)

(58) Field of Classification Search
CPC .... B60G 17/005; B60G 17/015; B60G 9/003; B60G 17/0195
See application file for complete search history.

(56) References Cited

U.S. PATENT DOCUMENTS

| 7,341,263 B2 | 3/2008 | Kuhn et al. | |
| 7,726,665 B2* | 6/2010 | Bitter | B60G 17/005 |
| | | | 180/41 |
| 2005/0098401 A1* | 5/2005 | Hamilton | B60G 17/0152 |
| | | | 188/378 |

FOREIGN PATENT DOCUMENTS

| DE | 19541823 A1 | 5/1997 |
| DE | 10106706 A1 | 9/2002 |

(Continued)

OTHER PUBLICATIONS

European Search Report in foreign counterpart application No. 16181737.4 dated Jan. 20, 2017 (5 pages).

(Continued)

*Primary Examiner* — Anne Marie Antonucci
*Assistant Examiner* — Renee Marie Larose

(57) ABSTRACT

A control device of a vehicle suspension has a suspension device mounted between a supporting vehicle structure and a vehicle part that is movably mounted. The control device includes a blocking device for blocking a compression or rebound motion occurring at the suspension device in correspondence with a blocking command transmitted to a control unit. The control unit determines a characteristic weight value for a current loading of the suspension device when the blocking command is set and stores it as a pertinent value in a memory unit. The control unit determines a value for the weight when the blocking command is reset in order to cancel a blocking of the suspension device according to the result of a comparison with the value stored in the memory unit.

18 Claims, 2 Drawing Sheets

(51) Int. Cl.
    *B60G 11/26*     (2006.01)
    *B60G 9/02*     (2006.01)
    *B60G 13/08*     (2006.01)
    *B62D 33/06*     (2006.01)

(52) U.S. Cl.
CPC ....... *B60G 17/018* (2013.01); *B62D 33/0608* (2013.01); *B60G 2200/32* (2013.01); *B60G 2202/154* (2013.01); *B60G 2204/46* (2013.01); *B60G 2204/4605* (2013.01); *B60G 2300/082* (2013.01); *B60G 2400/5122* (2013.01); *B60G 2500/20* (2013.01); *B60G 2600/07* (2013.01); *B60G 2600/70* (2013.01); *B60G 2600/85* (2013.01)

(56) References Cited

FOREIGN PATENT DOCUMENTS

| | | |
|---|---|---|
| DE | 10320954 B3 | 11/2004 |
| DE | 102006051894 A1 | 5/2008 |
| EP | 2896839 A1 | 7/2015 |

OTHER PUBLICATIONS

German Search Report issued in counterpart application No. 102015215872.1, dated Apr. 26, 2016 (7 pages).

\* cited by examiner

CONTROL DEVICE OF A VEHICLE SUSPENSION

RELATED APPLICATION

This application claims the benefit of German Application Ser. No. 102015215872.1, filed on Aug. 20, 2015, which is hereby expressly incorporated by reference in its entirety.

FIELD OF THE DISCLOSURE

The present disclosure relates to a control device of a vehicle suspension having a suspension device mounted between a supporting vehicle structure and a vehicle part, and in particular to a control device of a vehicle suspension having an electrically actuated blocking device to block a deflection or rebound motion arising at the suspension device in correspondence with a blocking command transmitted to a control unit.

BACKGROUND

Conventional control devices are disposed in agricultural tractors that have a suspended front axle. Thus, it is desirable, in particular when carrying out loading operations with a front loader, to suppress uncontrolled deflection and rebound at the suspended front axle caused by a changing load, by blocking the wheel suspension. If the blocking is cancelled, for example, for purposes of subsequent travel over roads, there is the possibility of a sudden expansion or compression of the suspension device if the load conditions on the suspended front axis have changed since the time of the blocking. The accompanying change of position of the agricultural tractor will be unexpected for the operator or nearby persons and for this reason is considered to be potentially dangerous.

Therefore, a need exists for an improved control device with regard to its unblocking behavior.

SUMMARY

In this disclosure, a control device of a vehicle suspension includes a suspension device that is mounted between a supporting vehicle structure and a vehicle part that is movably mounted. The control device includes a blocking device to block a deflection or rebound motion arising at the suspension device in correspondence with a blocking command transmitted to a control unit. According to the disclosure, when the blocking command is set, the control unit determines a weight value that is characteristic for a current loading of the suspension device and enters this value as the pertinent value in a memory unit. The control unit again determines a value for the weight when the blocking command is reset in order to cancel a blocking of the suspension device according to the results of comparison with the value stored in the memory unit.

In this way, when the blocking is cancelled, an evaluation can be made on the basis of the difference between the two values determined for the weight regarding whether or not one should expect a sudden expansion or compression of the suspension device because of load conditions that have changed so that appropriate countermeasures may be taken. For this, the control unit tests to see whether a preset critical limit value for the difference of the two values has been exceeded.

The cancellation of the blocking on the part of the control unit takes place gradually according to the comparison results while maintaining a preset unblocking sequence, in particular within a time span that is dependent on the comparison result. The gradual cancellation of the blocking can be carried out either step-wise or continuously, and the greater the difference that exists between the values that are determined for the weight, the longer the time span that can be chosen. This ensures that the expansion or compression of the suspension device does not take place abruptly, but rather in a delayed fashion in correspondence with the extent of the changed load conditions.

In addition, the control unit can induce an output of driver information indicating the cancellation of the blocking. The output of the driver information takes place acoustically or visually via an operator interface disposed in a vehicle cabin.

The suspension device may be a hydraulic suspension strut of a wheel or cabin suspension of an agricultural utility vehicle. Such a wheel suspension is typically used in John Deere agricultural tractors as a component of a so-called TLS axle (Triple Link Suspension). The TLS axle includes a freely suspended rigid axle, which is articulately supported on a vehicle frame by means of two double-acting hydraulic cylinders. Each of the hydraulic cylinders has an annulus-side and a cylinder space-side working chamber, where the two working chambers each interact with the pertinent diaphragm accumulator. In order to achieve a desired suspension characteristic, the annulus-side working chamber can be pressurized with a settable preload pressure. A leveling system allows a change of the pressure ratios in the cylinder space-side working chambers and thus allows an adjustment of the position of the vehicle frame with respect to the ground. If the cancellation of the blocking leads to a deviation of the vehicle frame from the desired position or of the preset preload pressure, then, if necessary, first an adjustment of the preload pressure is completed and then a resetting of the desired position of the vehicle frame is made on the part of the leveling system.

At this point it is noted that the TLS axle is only one of many examples for using the control device according to the present disclosure. Rather, it may be used with wheel or cabin suspensions of any kind.

The blocking device can include a 3/2-way valve or proportional valve disposed between a working chamber of the hydraulic suspension strut and a diaphragm accumulator. In the case of the double-acting hydraulic cylinder described above, the 3/2-way valve or the proportional valve is typically disposed in a hydraulic circuit between the cylinder space-side working chamber and the pertinent diaphragm accumulator. While the proportional valve allows an essentially continuous variation of its opening cross section, the 3/2-way valve can be switched between a completely blocked flow position, a restricted flow position, and an unrestricted flow position. Accordingly, this allows it to adjust the opening cross section in terms of producing a step-wise pressure equalization to the diaphragm accumulator in three steps. The gradual cancellation of the blocking then takes place through controlled up and down switching or modulation of the 3/2-way valve between the three valve positions. By comparison, the proportional valve is controlled such that a gradual pressure equalization with the diaphragm accumulator takes place.

In order to suppress changes of position between the supporting vehicle structure and the movably mounted vehicle part for lengthy periods of standing with the suspension device blocked, the 3/2-way valve or the proportional valve may have a leak-tight blocking position.

The value determined for the weight reflects a considerable difference of the working pressures that exist between the opposing working chambers of the hydraulic suspension strut. In the case of the double acting hydraulic cylinder described above, the detection of the working pressures takes place by means of pressure sensors associated with the annulus-side or the cylinder space-side working chambers, the sensor signals of which are sent to the control unit for evaluation.

The setting or resetting of the blocking command can take place by means of manual operator intervention or automatically if an operating state pointing to a changing load of the suspension device is detected. The latter is the case, for example, in a front loader operation of an agricultural tractor. This also applies to the mounting of front weights or agricultural attachments.

Moreover, during the blocking the suspension device, the control unit outputs a status signal intended to limit the vehicle speed. The status signal can be sent to an engine control device which limits the rotary speed of a vehicle engine when a maximum vehicle speed set by the status signal has been reached so that a road-related vibrational input that is higher when the suspension device is blocked is limited in its extent. The maximum vehicle speed may be, for example, 30 km/h. This, however, is only an example and is not intended to be limiting to this disclosure as other vehicle speeds are considered herein.

It is also conceivable that the control unit executes the blocking or the cancellation of the blocking only when there is a status signal that indicates a vehicle stop so that the suspension device cannot become blocked or released outside of its equilibrium state and thus while it is in a tensioned state. The existence of the vehicle stop, i.e., like the achievement of said vehicle speed limitation, is detected by the control unit by evaluating the rotational speed signals provided by wheel rotational speed sensors.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
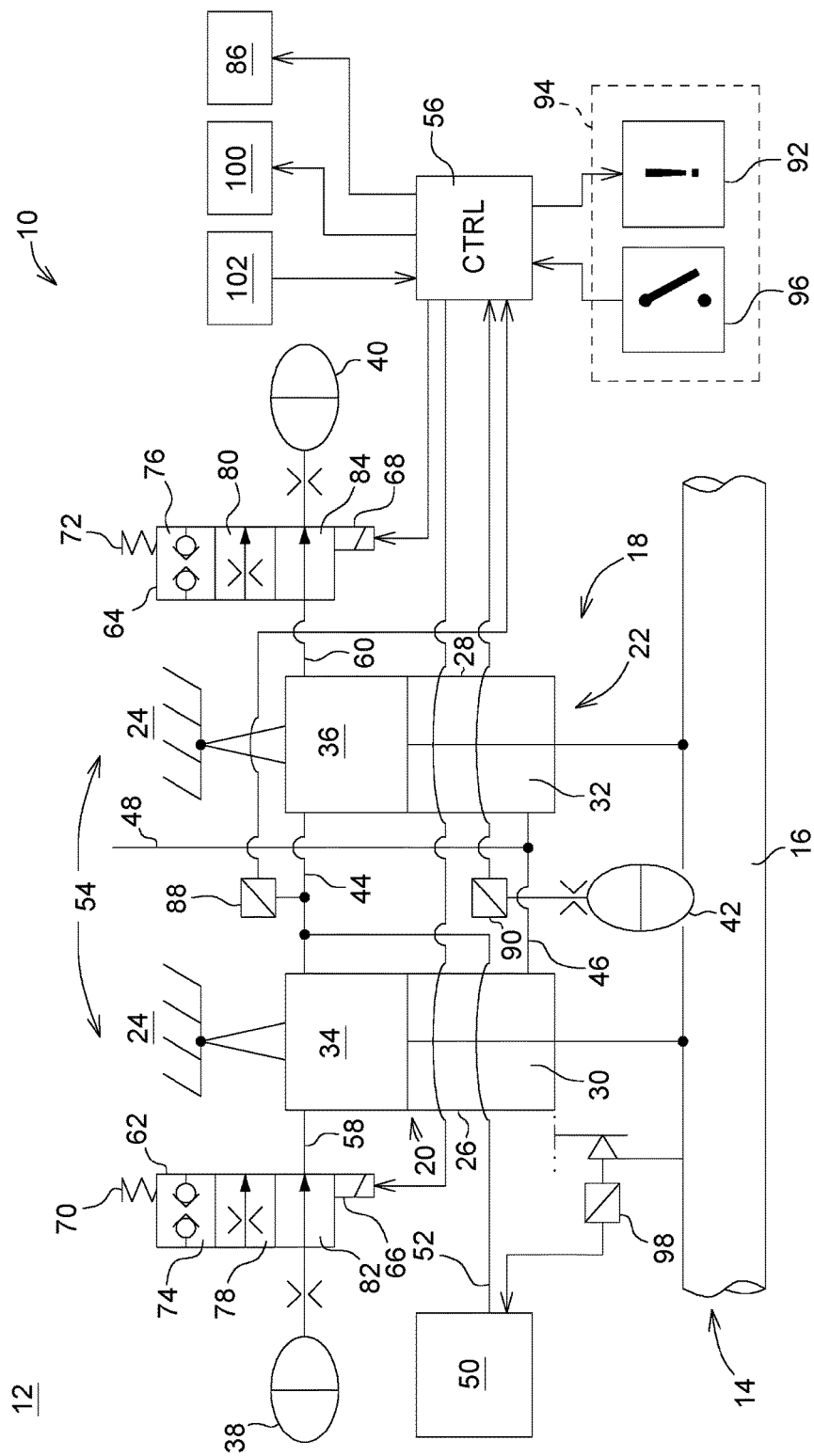
FIG. 1 is a schematic view of a first embodiment of a control device of a vehicle suspension.

FIG. 1 shows a first embodiment of a control device of a vehicle suspension. In this illustrated embodiment, the control device 10 is a component of an agricultural utility vehicle (not shown) such as an agricultural tractor 12. The agricultural tractor 12 has a vehicle suspension with a suspended front axle 14 which in the present case is a so-called TLS axle (Triple Link Suspension). The TLS axle includes a freely suspended rigid axle 16, which is articulately supported by means of a suspension device 18 in the form of two hydraulic suspension struts 20, 22 on a supporting vehicle structure, more precisely a vehicle frame 24 of the agricultural tractor 12. Each of the hydraulic struts 20, 22, which are made as double acting hydraulic cylinders 26, 28, has an annulus-side working chamber 30, 32 and a cylinder space-side working chamber 34, 36, where the two cylinder space-side working chambers 34, 36 interact with separate diaphragm accumulators 38, 40 and the two annulus-side working chambers 30, 32 interact with a common diaphragm accumulator 42. The annulus-side working chambers 30, 32 and the cylinder space-side working chambers 34, 36 are each connected together via the pertinent hydraulic lines 44, 46.

The annulus-side working chambers 30, 32 of the hydraulic cylinders 26, 28 can be pressurized with a selectable or settable preload pressure via a first hydraulic supply line 48 in order to achieve a desired suspension characteristic. Three different pressure steps are available to preset the preload pressure, each of which takes into account different loading conditions of the agricultural tractor 12. A leveling system 50 further allows a change of the pressure ratios within the cylinder space-side working chambers 34, 36 of the hydraulic cylinders 26, 28, and thus allows an adjustment of a position of the vehicle frame 24 relative to the ground. This may be achieved by appropriately varying the pressure in the cylinder space-side working chambers 34, 36 via a second hydraulic supply line 52.

Moreover, the control device 10 may include a blocking device 54. This allows a blocking of a deflection or a rebound motion arising at the hydraulic cylinders 26, 28 in correspondence with a blocking command transmitted to a control unit 56.

According to the first embodiment of the control device 10, which is represented in FIG. 1, the blocking device 54 includes for each of the two hydraulic cylinders 26, 28 a 3/2-way valve 62, 64 that is disposed in a hydraulic line 58, 60 between the cylinder space-side working chamber 34, 36 and the pertinent diaphragm accumulator 38, 40. The 3/2-way valve 62, 64 can be switched by appropriate energization of a solenoid 66, 68 against the action of a return spring 70, 72, between a completely blocked flow position 74, 76, a restricted flow position 78, 80, and an unrestricted flow position 82, 84. This makes it possible to vary the opening cross section for producing a pressurization equalization between the cylinder space-side working chamber 34, 36 and the pertinent diaphragm accumulator 38, 40 in three steps. The completely blocked flow position 74, 76 is made leak-tight.

The blocking of the suspension device 18 takes place by setting the blocking command, whereupon the control unit 56 first determines the current load of the hydraulic cylinders 26, 28 on the basis of a weight value that is characteristic for this and enters it as the pertinent value in a memory unit 86.

The value determined for the weight reflects a considerable difference of the working pressures $p_r$ and $p_z$ that exist between the annulus-side working chambers 30, 32 and the cylinder space-side working chambers 34, 36 of the hydraulic cylinders 26, 28. The detection of the working pressures $p_r$ and $p_z$ takes place by means of pertinent pressure sensors 88, 90. These sensor signals are sent to the control unit 56 for evaluation.

The lifting of the blocking of the suspension device 18 conversely takes place by resetting the blocking command, whereupon the control unit 56 again determines a value for the weight and compares it to the value stored in the memory unit 86. Based on the difference between the two values determined for the weight, the control unit 56 makes an evaluation as to whether one should expect a sudden expansion or compression of the suspension device 18 if the blocking is cancelled. For this, the control unit 56 tests to see if a critical limit value that has been specified for the difference of the two values has been exceeded.

If this is the case, the control unit 56 gradually cancels the blocking of the suspension device 18 while maintaining a preset unblocking sequence. This may first be executed by repeatedly switching on and off, or modulation of a 3/2-way valve 62, 64 between the completely blocked flow position 74, 76 and the restricted flow position 78, 80, and then switching to the unrestricted flow position 82, 84 so that a stepwise pressure equalization takes place between the cylinder space-side working chambers 34, 36 and the pertinent diaphragm accumulators 38, 40. The unblocking sequence can be carried out within a preset time span, and the greater the difference between the two values determined for the weight, the longer the time span will be.

In addition, the control unit 56 causes the output of driver information 92 indicating the cancellation of the blocking. The driver information 92 is output acoustically or visually via an operator interface 94 disposed in a driver cabin.

On the other hand, if the control unit 56 determines that the preset critical limit value for the difference of the two values has not been exceeded, it can be concluded that there are essentially unchanged load conditions on the suspended front axle 14, and the 3/2-way valves 62, 64 can be switched by the control unit 56 directly from the completely blocked flow position 74, 76 to the unrestricted flow position 82, 84.

The setting or resetting of the blocking command takes place on the basis of a manual operator entry 96 made at the operator interface 94 or automatically upon detection of an operating state indicating a changing load on the suspension device 18. The latter is the case, for example, if there is an intentional front loader operation of the agricultural tractor 12.

If the cancellation of the blocking should lead to a change of the position of the vehicle frame 24 or of the preload pressure, first an adjustment of the preload pressure and then a resetting of the desired position of the vehicle frame 24 on the part of the leveling system 50 will take place as necessary. The desired position is monitored in this case by means of a position sensor 98 connected to the leveling system 50.

Moreover, in the case of the blocking of the suspension device 18, the control unit 56 outputs a status signal that is intended to limit the vehicle speed. The status signal is sent to an engine control device 100, which limits the rotary speed of a vehicle engine when a maximum vehicle speed set by the status signal has been reached. The maximum vehicle speed may be, for example, 30 km/h.

The control unit 56 carries out the blocking or cancellation of the blocking only when there is a status signal indicating that the vehicle is stopped. The existence of the vehicle stop, i.e., like the reaching of said vehicle speed limitation, is detected by the control unit 56 by evaluating the rotary speed signals provided by wheel speed sensors 102.

For the sake of completeness, it should be noted that instead of a freely suspended rigid axle 16, the present disclosure can apply to any other vehicle part of a wheel or cabin suspension of the agricultural utility vehicle that is mounted movably with respect to the supporting vehicle structure by means of a corresponding suspension device. This may be, for example, a suspended vehicle cabin or a wheel mount of a single wheel suspension.

Figure 2:
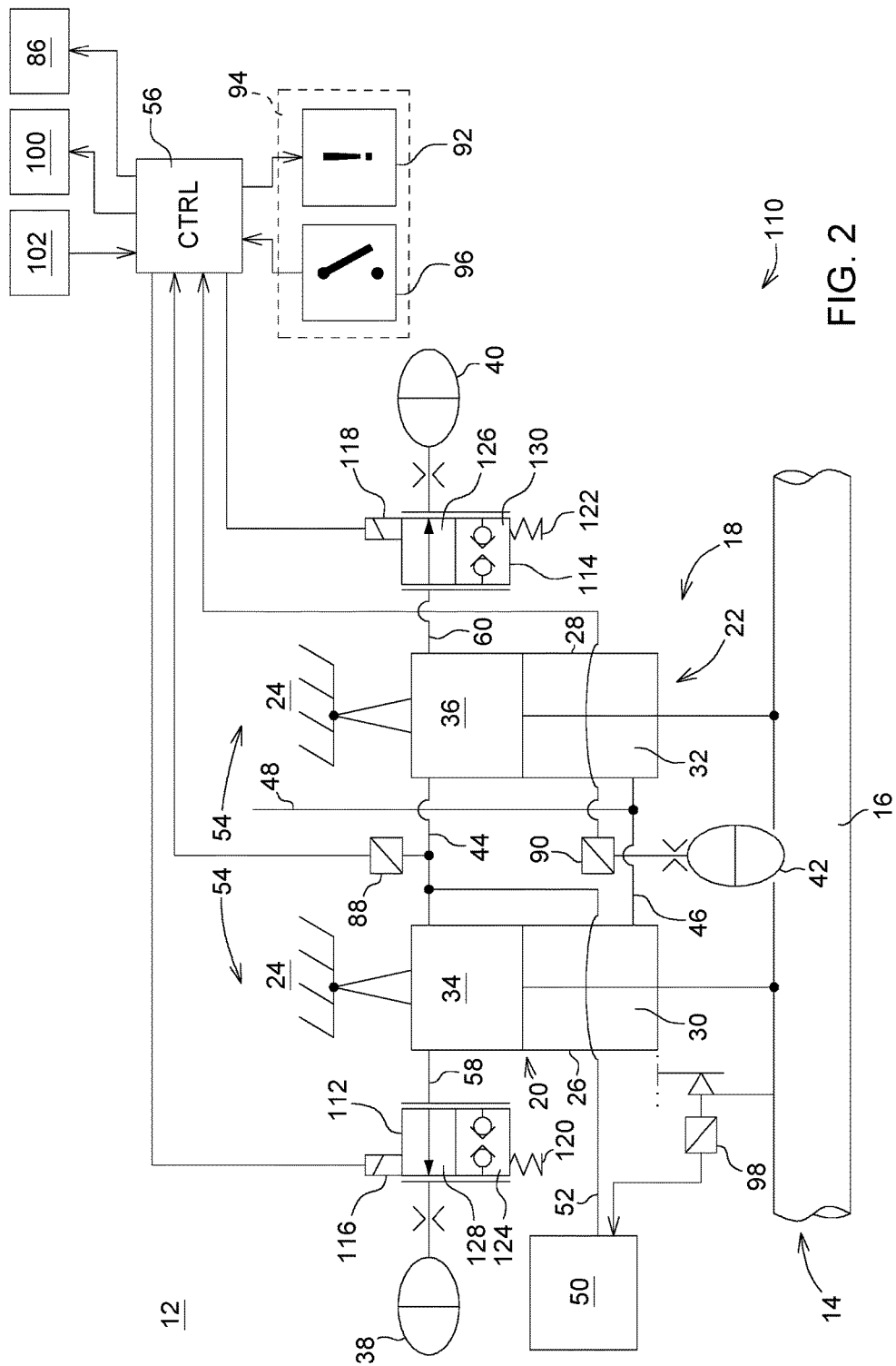
FIG. 2 a schematic view of a second embodiment of a control device of a vehicle suspension

FIG. 2 shows a second embodiment of a control device 110 of a vehicle suspension in accordance with this disclosure. The control device 110 that is shown differs from the first embodiment of FIG. 1 only with regard to the design of the blocking device 54 and the unblocking sequence carried out by the control unit 56.

Accordingly, the blocking device 54 may include a proportional valve 112, 114 disposed in the hydraulic line 58, 60 between the cylinder space-side working chambers 34, 36 and the pertinent diaphragm accumulators 38, 40 for each of the two hydraulic cylinders 26, 28. The proportional valve 112, 114 can be shifted by appropriate energization of a solenoid 116, 118 against the action of a reset spring 120, 122 between a leak-tight blocking position 124, 126 and a flow position 128, 130. This allows continuous variation of the opening cross-section for producing a pressure equalization between the cylinder space-side working chamber 34, 36 and the pertinent diaphragm accumulator 38, 40.

To execute the unblocking sequence, the control unit 56 controls the proportional valves 112, 114 starting from the blocking position 124, 126 so that a gradual pressure equalization takes place between the cylinder space-side working chambers 34, 36 and the pertinent diaphragm accumulators 38, 40. The proportional valves 112, 114 are then moved into the flow position 128, 130 to enable unhindered hydraulic flow between the cylinder space-side working chambers 34, 36 and the pertinent diaphragm accumulators 38, 40.

If, on the other hand, it is not necessary to carry out the unblocking sequence because of largely unchanged load conditions on the suspended front axle 14, the proportional valves 112, 114 are switched by the control unit 56 directly from the blocking position 124, 126 to the flow position 128, 130.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A control device of a vehicle suspension, comprising:
a suspension device which is mounted between a supporting vehicle structure and a vehicle part
a blocking device to block a compression or rebound motion occurring on the suspension device in accordance with a blocking command transmitted to a control unit;
wherein, when the control unit sets the blocking command, the control unit determines a characteristic weight value for a current loading of the suspension device and stores it as a pertinent value in a memory unit;
wherein, when the control unit resets the blocking command, the control unit determines a new value for the weight in order to cancel a blocking of the suspension device according to a result of a comparison with the values stored in the memory unit;
wherein the control unit cancels the blocking command gradually while it maintains a preset unblocking sequence within a time span that is dependent on the comparison result.

2. The control device of claim 1, wherein the control unit induces an output of driver information indicating the cancellation of the blocking.

3. The control device of claim 1, wherein the suspension device comprises a hydraulic suspension strut of a wheel of an agricultural utility vehicle.

4. The control device of claim 3, wherein the blocking device comprises a 3/2-way valve or proportional valve disposed between a working chamber of the hydraulic suspension strut and a diaphragm accumulator.

5. The control device of claim 4, wherein the 3/2-way valve or the proportional valve comprises a leak-tight blocking position.

6. The control device of claim 3, wherein the value determined for the weight comprises a difference between the working pressures of opposing working chambers of the hydraulic suspension strut.

7. The control device of claim 1, wherein the setting or resetting of the blocking command takes place on the basis of a manual operator input or automatically upon detection of an operating state indicating a changing load of the suspension device.

8. The control device of claim 1, wherein during the blocking of the suspension device, the control unit outputs a status signal for limiting vehicle speed.

9. The control device of claim 1, wherein the control unit executes the blocking or the cancellation of the blocking only in the presence of a status signal indicating a vehicle stop.

10. An agricultural utility vehicle, comprising:
a frame;
a vehicle suspension with a suspended front axle; and
a control device including a suspension device mounted between a supporting vehicle structure and a vehicle part, a blocking device to block a compression or rebound motion occurring on the suspension device in accordance with a blocking command transmitted to a control unit;
wherein, when the control unit sets the blocking command, the control unit determines a characteristic weight value for a current loading of the suspension device and stores it as a pertinent value in a memory unit;
wherein, when the control unit resets the blocking command, the control unit determines a new value for the weight in order to cancel a blocking of the suspension device according to a result of a comparison with the values stored in the memory unit;
wherein the control unit cancels the blocking command gradually while it maintains a preset unblocking sequence within a time span that is dependent on the comparison result.

11. The agricultural utility vehicle of claim 10, wherein the control unit induces an output of driver information indicating the cancellation of the blocking.

12. The agricultural utility vehicle of claim 10, wherein the suspension device comprises a hydraulic suspension strut of a wheel or of an agricultural utility vehicle.

13. The agricultural utility vehicle of claim 12, wherein the blocking device comprises a 3/2-way valve or proportional valve disposed between a working chamber of the hydraulic suspension strut and a diaphragm accumulator.

14. The agricultural utility vehicle of claim 13, wherein the 3/2-way valve or the proportional valve comprises a leak-tight blocking position.

15. The agricultural utility vehicle of claim 12, wherein the value determined for the weight comprises a difference between the working pressures of opposing working chambers of the hydraulic suspension strut.

16. The agricultural utility vehicle of claim 10, wherein the setting or resetting of the blocking command takes place on the basis of a manual operator input or automatically upon detection of an operating state indicating a changing load of the suspension device.

17. The agricultural utility vehicle of claim 10, wherein during the blocking of the suspension device, the control unit outputs a status signal for limiting vehicle speed.

18. The agricultural utility vehicle of claim 10, wherein the control unit executes the blocking or the cancellation of the blocking only in the presence of a status signal indicating a vehicle stop.

* * * * *